US010591908B2

(12) United States Patent
Harshbarger (10) Patent No.: US 10,591,908 B2
(45) Date of Patent: Mar. 17, 2020

(54) RIG OR WELLSITE SAFETY INTERVENTION

(71) Applicant: FORUM US, INC., Houston, TX (US)

(72) Inventor: Chris Harshbarger, Cypress, TX (US)

(73) Assignee: FORUM US, INC., Houston, TX (US)

( * ) Notice: Subject to any disclaimer, the term of this patent is extended or adjusted under 35 U.S.C. 154(b) by 172 days.

(21) Appl. No.: 15/624,984

(22) Filed: Jun. 16, 2017

(65) Prior Publication Data

US 2018/0364693 A1 Dec. 20, 2018

(51) Int. Cl.
| G05B 23/02 | (2006.01) |
| F16P 3/14 | (2006.01) |
| E21B 41/00 | (2006.01) |
| G05B 9/03 | (2006.01) |
| G05B 19/048 | (2006.01) |
| F24F 11/30 | (2018.01) |

(52) U.S. Cl.
CPC ........ *G05B 23/027* (2013.01); *E21B 41/0021* (2013.01); *F16P 3/141* (2013.01); *F16P 3/142* (2013.01); *F16P 3/144* (2013.01); *F16P 3/145* (2013.01); *F16P 3/147* (2013.01); *F24F 11/30* (2018.01); *G05B 9/03* (2013.01); *G05B 19/048* (2013.01)

(58) Field of Classification Search
CPC ...... G05B 23/027; G05B 9/03; G05B 19/048; E21B 41/0021; F16P 3/141; F16P 3/142; F16P 3/144; F16P 3/145; F16P 3/147; F24F 11/30
USPC ........................................................ 307/326
See application file for complete search history.

(56) References Cited

U.S. PATENT DOCUMENTS

| 6,600,418 B2 | 7/2003 | Francis et al. |
| 6,659,174 B2 | 12/2003 | Hogan |
| 7,036,729 B2 | 5/2006 | Chung |
| 7,603,296 B2 | 10/2009 | Whiteley et al. |
| 7,962,319 B2 | 6/2011 | Grayson |
| 8,204,697 B2 | 6/2012 | Garvey et al. |
| 8,215,417 B2 | 7/2012 | Annaiyappa et al. |
| 8,825,414 B2 | 9/2014 | Garvey et al. |
| 9,030,324 B2 | 5/2015 | Christiansen et al. |
| 9,070,275 B1 * | 6/2015 | Green .................. H04W 4/029 |
| 9,260,943 B2 | 2/2016 | Eriksson et al. |
| 9,269,199 B2 | 2/2016 | Laughlin et al. |
| 9,417,160 B2 | 8/2016 | Hunter |
| 9,418,266 B1 | 8/2016 | Malone |

(Continued)

FOREIGN PATENT DOCUMENTS

| EP | 2952671 A1 | 12/2015 |
| WO | 2016178069 A1 | 11/2016 |

OTHER PUBLICATIONS

International Search Report and Written Opinion dated Aug. 2, 2018, Corresponding to Application No. PCT/US2018/031625.

*Primary Examiner* — Hal Kaplan
(74) *Attorney, Agent, or Firm* — Patterson + Sheridan, LLP (57) ABSTRACT

A safety intervention system comprising a control system in communication with one or more pieces of equipment on a rig or wellsite via an equipment sensor coupled to each piece of equipment or one or more rig sensors located on the rig or wellsite, and a personnel sensor coupled to a person configured to provide position information of the person to the control system, wherein the control system is configured to determine the person's position relative to each piece of equipment.

17 Claims, 6 Drawing Sheets

(56) References Cited

U.S. PATENT DOCUMENTS

| | | |
|---|---|---|
| 9,547,831 B2 | 1/2017 | Laase et al. |
| 9,657,567 B2 | 5/2017 | Malayappalayam Shanmugam et al. |
| 2001/0047283 A1 | 11/2001 | Melick et al. |
| 2008/0018472 A1* | 1/2008 | Dasilva ................ G08B 25/016 340/572.4 |
| 2008/0024274 A1 | 1/2008 | Ishida et al. |
| 2008/0059411 A1 | 3/2008 | Greiner et al. |
| 2008/0201388 A1 | 8/2008 | Wood et al. |
| 2009/0121895 A1 | 5/2009 | Denny et al. |
| 2015/0332073 A1 | 11/2015 | Murphy |
| 2016/0306831 A1 | 10/2016 | Holmes et al. |

* cited by examiner

RIG OR WELLSITE SAFETY INTERVENTION

BACKGROUND

Field

Embodiments disclosed herein relate to methods and apparatus for increasing safety on or at an oil and gas rig or wellsite.

Description of the Related Art

Personnel working on or in the vicinity of equipment used on an oil and gas rig or wellsite are always at risk of injury. Numerous pieces of large handling and/or rotating equipment, which are often highly pressurized, are being operated simultaneously on the rig or wellsite and present constant hazards for injury to personnel working nearby. The risk of injury has increased in recent years as the equipment on the rig or at the wellsite is more mechanized and automated.

Therefore, there exists a need for a new and improved rig and/or wellsite safety methods and apparatus.

SUMMARY

In one embodiment, a safety intervention system comprises a control system in communication with one or more pieces of equipment on a rig or wellsite via an equipment sensor coupled to each piece of equipment or one or more rig sensors located on the rig or wellsite; and a personnel sensor coupled to a person, wherein the personnel sensor is configured to provide position information of the person to the control system, and wherein the control system is configured to determine the person's position relative to each piece of equipment.

In one embodiment, a safety intervention method comprises receiving equipment data from an equipment sensor coupled to a piece of equipment or a rig sensor located on a rig or wellsite; calculating a safety zone of the piece of equipment based on the equipment data; receiving personnel data from a personnel sensor on a person; calculating a location of the person based on the personnel data; and determining whether the person is near or within the safety zone.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include methods and apparatus for safety intervention on an oil and gas rig and/or at an oil and gas wellsite.

Figure 1A:
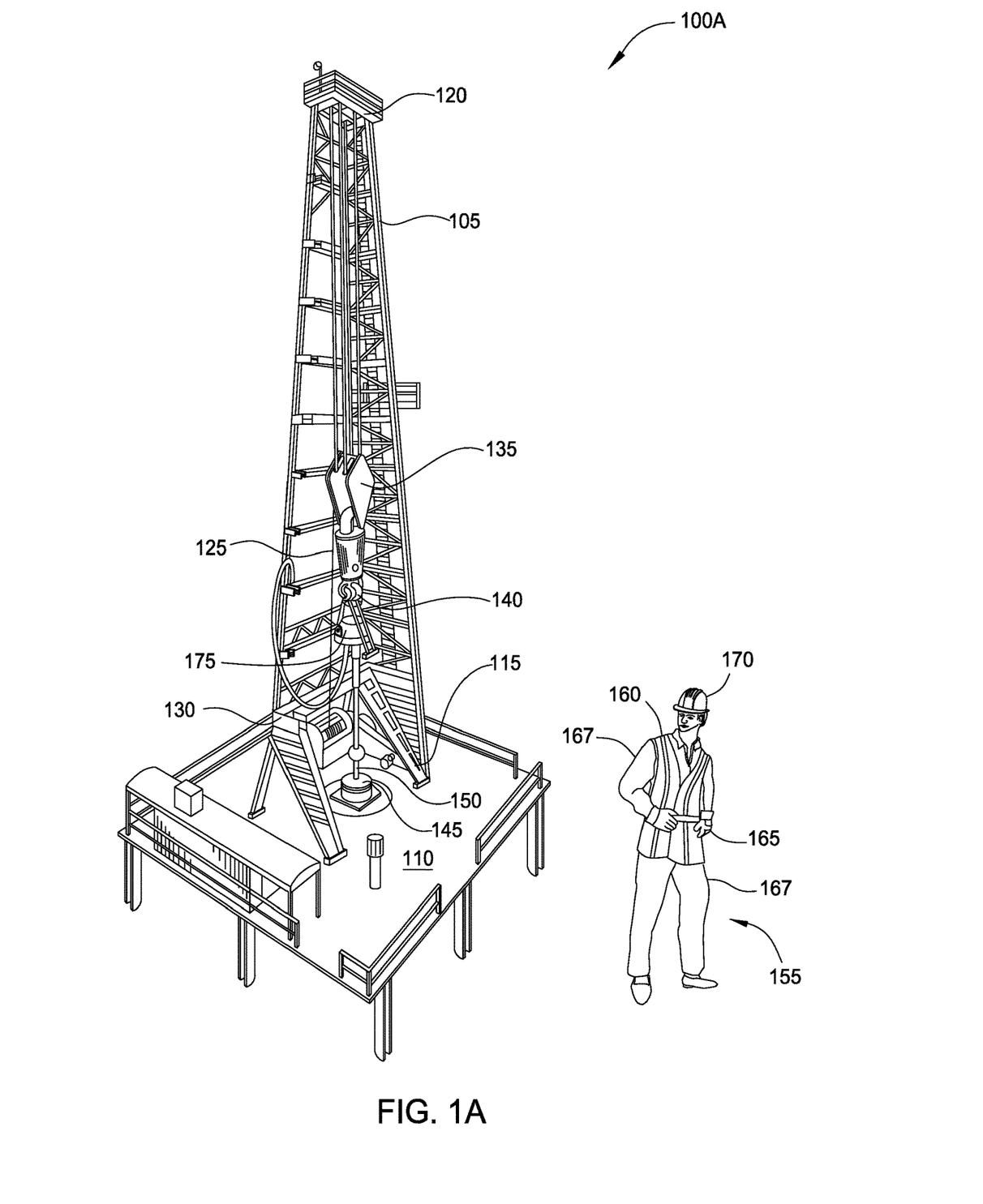
FIG. 1A illustrates one embodiment of a rig and various pieces of equipment located thereon.

FIG. 1A illustrates an oil and gas rig 100A having a mast 105 supported on a rig floor 110 by a frame 115, according to one embodiment. The mast 105 supports a crown block and sheave 120 from which a traveling block 135 is raised and lowered by a draw works 130 via a cable 125. Any number of pieces of tubular handling equipment (such as an elevator, a swivel, a torque head, a mud line, etc.) generally identified by reference numeral 175 may pose a safety hazard for personnel 155. For example, the tubular handling equipment 175 is suspended from the traveling block 135 by a hook 140 and used to raise and lower a tubular 150. A rotary table 145 is disposed in the rig floor 110 and may contain a kelly bushing through which the tubular 150 passes while being rotatable by the rotary table 145. Any of these pieces of tubular handling equipment may injure personnel 155.

Figure 1B:
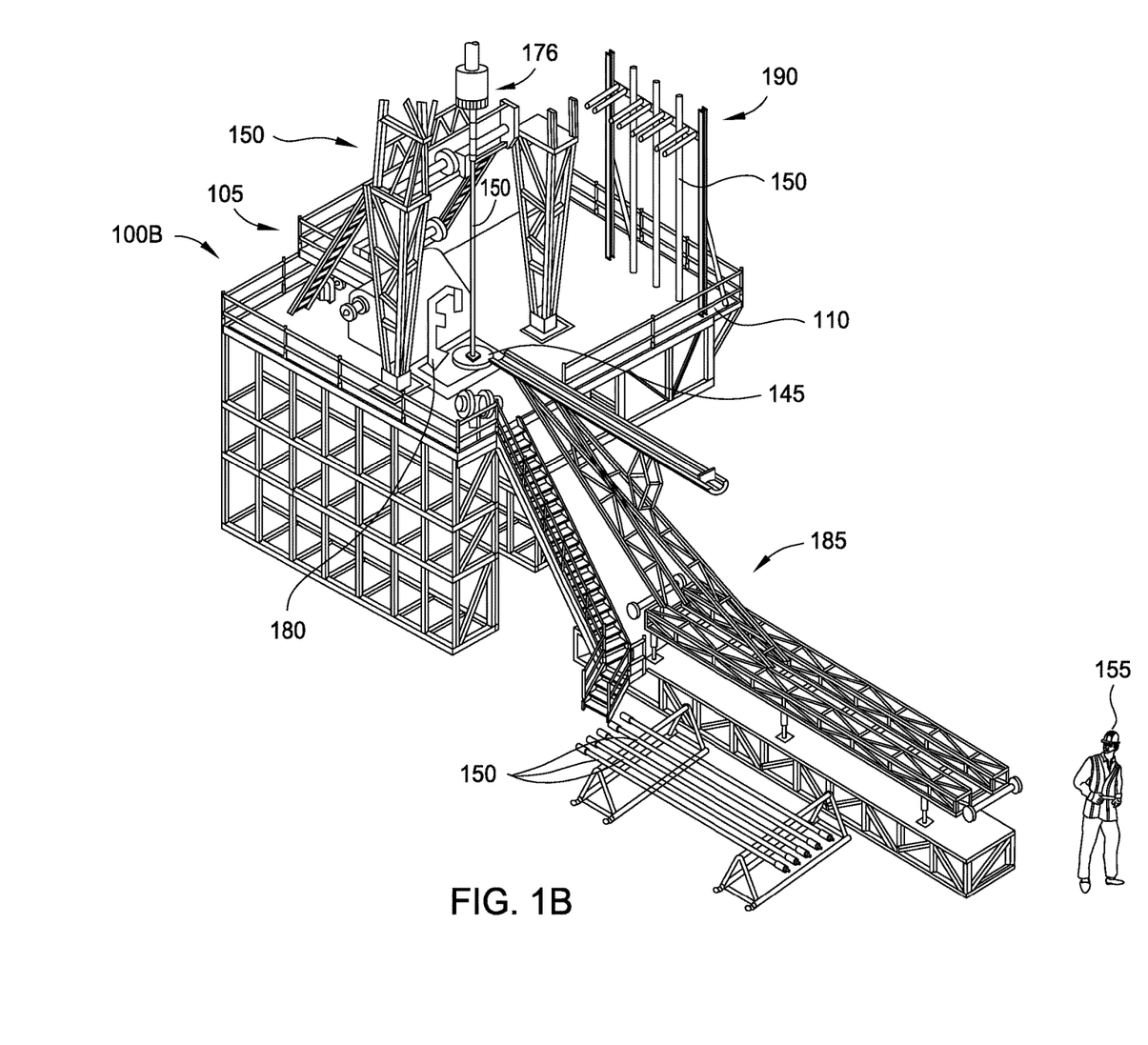
FIG. 1B illustrates another embodiment of a rig and various pieces of equipment located thereon.

FIG. 1B illustrates an oil and gas rig 100B having a mast 105 supported on a rig floor 110, according to another embodiment. The mast 105 supports a top drive 176 and an iron roughneck 180. A catwalk 185 may transfer tubulars 150 from a pipe rack located adjacent to the rig floor 110. The catwalk 185 may also supply tubulars 150 to be made-up and stored in a racking system 190. Any number of pieces of tubular handling equipment (such as the top drive 176, the iron roughneck 180, the catwalk 185, the racking system 190, etc.) may pose a safety hazard for personnel 155.

Although many of the pieces of equipment on the rig 100A or 100B are automated and/or operated remotely (e.g. such as from a control room located away from the equipment), there are still numerous personnel 155 often working on, or adjacent to, the rig floor 110 during an oil and gas operation. The personnel 155 are required to wear personal protection equipment (PPE) which may consist of a safety vest 160, a pair of safety gloves 165, flame resistant clothing 167, and a hardhat 170, among other PPE. However, the risk of injury to the personnel 155 increases when the personnel 155 are in the vicinity of one or more pieces of moving equipment on the rig floor 110.

Figure 2A:
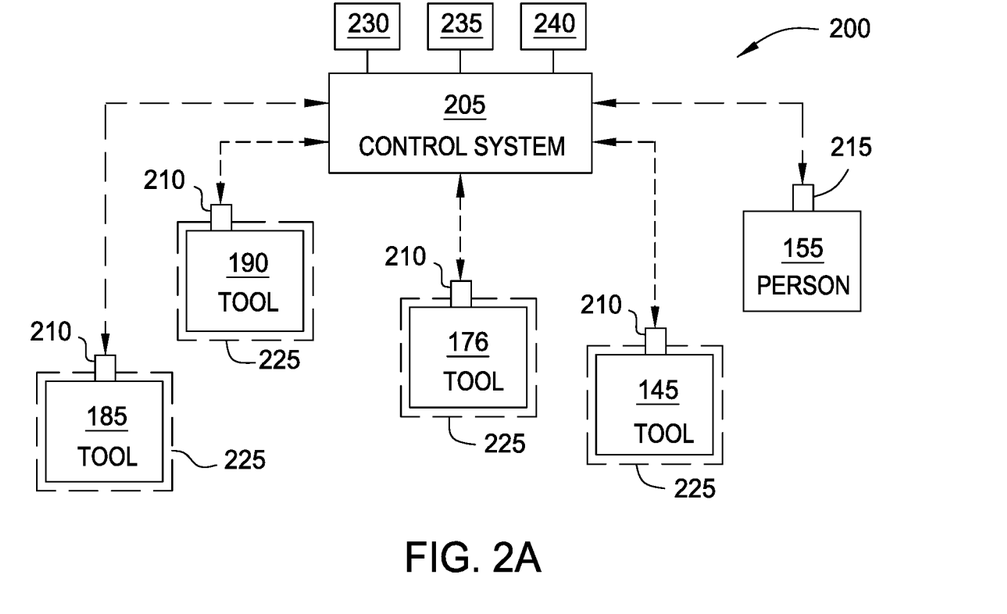
FIG. 2A is a schematic of an intervention system, according to one embodiment.

FIG. 2A is a schematic of an intervention system 200, according to one embodiment. The intervention system 200 includes a control system 205 that is in communication with the various pieces of equipment on the rig 100A or 100B. The control system 205 is configured to monitor the location of and/or control the operation of the various pieces of equipment on the rig 100A or 100B.

As shown, the racking system 190, the top drive 176, the catwalk 185, and the rotary table 145 each have an equipment sensor 210 that is in (wired and/or wireless) communication with the control system 205. The sensor 210 is configured to transmit one or more signals corresponding to the location of the specific piece of equipment. The signals received by the control system 205 from the sensors 210 may be used to monitor the location of and/or control the operation of the various pieces of equipment.

Similarly, any of the personal protection equipment (PPE) of the personnel 155 may include one or more personnel sensors 215 coupled to the PPE. For example, the sensor 215 may be coupled to one or more of the flame resistant clothing 167, the safety vest 160, the pair of gloves 165, or the hardhat 170 (all shown in FIG. 1) of the personnel 155, or other articles of clothing and/or safety equipment. The sensor 215 may be used to track the location of the personnel 155 wearing the sensor 215 by transmitting one or more signals corresponding to the location of the sensor 215 to the control system 205.

The sensors 210, 215 may consist of, or be enabled as, one or more of a global positioning system (GPS), radio frequency identification (RFID), a video camera (visible and/or infrared (IR)), sound navigation and ranging (sonar), light imaging, detection and ranging (LIDAR), and a motion sensor capable of monitoring kinematics. The sensors 210, 215 may be embedded in or coupled to the flame resistant clothing 167, the safety vest 160, the pair of gloves 165, or the hardhat 170.

The control system 205 is adapted to receive and process signals from the sensors 210, 215 to determine positions of personnel 155 and/or other pieces of equipment. For example, a GPS enabled transmitting sensor may provide geographical location and time information to the control system 205 to determine location and/or positions of the sensors 210, 215. In another example, a GPS enabled transmitting camera may transmit location/time stamped images to the control system 205, which the control system 205 may use to compare with locations of other pieces of equipment. In another example, LIDAR or sonar may transmit light or sound information, respectively, which the control system 205 may use for ranging and/or location determinations. In another example, kinematic information from body sensors may be transmitted to the control system 205 which may be used to determine position of personnel 155 and/or equipment.

In one embodiment, the sensors 210, 215 may be a GPS enabled radio frequency identification (RFID) tag that is in communication with the control system 205. In one embodiment, the sensors 210, 215 may be an active RFID tag, which includes an on-board power source (e.g. a battery) that continuously transmits the location of the equipment or the personnel 155 wearing the sensor 215 to the control system 205. In one embodiment, the sensors 210, 215 may be a passive RFID tag that transmits the location of the equipment or the personnel 155 wearing the sensor 215 in response to a signal by the control system 205.

Referring to FIG. 2A, the control system 205 calculates an individual safety zone 225 about the perimeter of the racking system 190, the top drive 176, the catwalk 185, and the rotary table 145, separately, based on the location communicated to the control system 205 by the sensors 210. In one embodiment, the control system 205 may be pre-programmed with one or more safety zones 225 corresponding to various pieces of equipment. In one embodiment, the control system 205 may use a combination of pre-programmed location information and the location information received by the sensors 210 to determine the safety zones 225 for the various pieces of equipment.

Each safety zone 225 may include an area or volume where the piece of equipment operates. Each safety zone 225 may also include an area or volume where the personnel 155 may be in danger of moving parts, a drop hazard, an explosion hazard, or other types of safety risks. For example, each safety zone 225 may include a length, width, and/or height that the piece of equipment needs for operation without interference with other pieces of equipment or the personnel 155.

Each safety zone 225 may be an imaginary boundary recognized by the control system 205 only. In one embodiment, each safety zone 225 may be an imaginary boundary recognized by the control system 205 and the sensors 210. In one embodiment, each safety zone 225 may be an imaginary boundary recognized by the control system 205, the sensors 210, and/or the sensors 215.

Figure 2B:
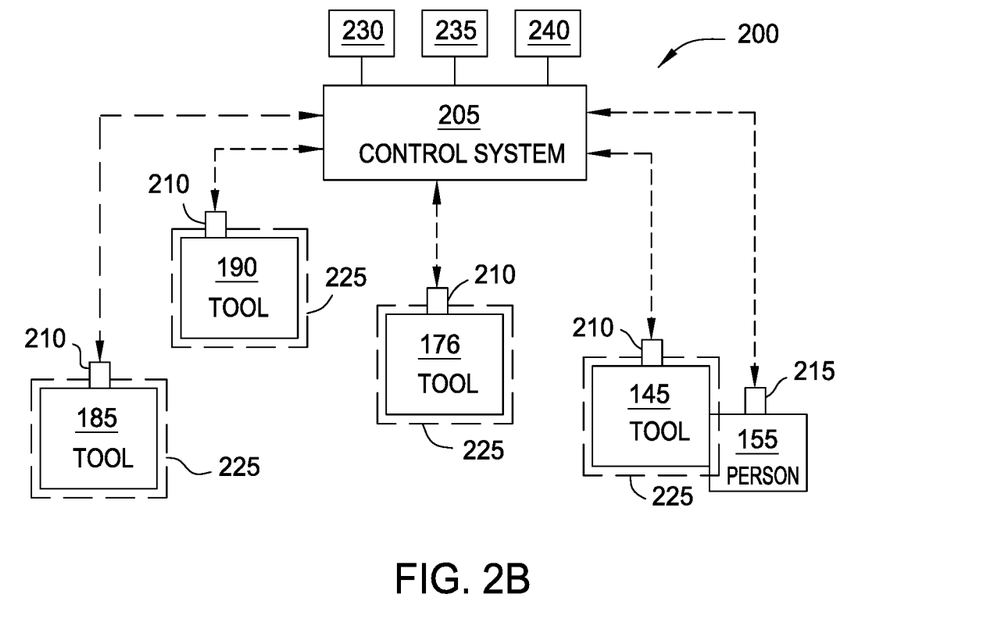
FIG. 2B is a schematic of the intervention system of FIG. 2A in a different operating position, according to one embodiment.

FIG. 2B is a schematic of the intervention system 200 where the personnel 155 is within one of the safety zones 225 (e.g. near the rotary table 145). Referring to FIG. 2B, in the event that the personnel 155 or a piece of equipment are approaching and/or enter any one of the safety zones 225, the control system 205 is configured to enact one or more of the following intervention procedures, separately or simultaneously, as discussed below.

One intervention procedure would be for the control system 205 to activate an alarm 230. The alarm 230 may provide an audible and/or visual signal that warns the personnel 155 that they are approaching or within one of the safety zones 225. The alarm 230 may be activated when the personnel 155 are approaching the safety zone 225 (e.g. within a predetermined distance) and/or when the safety zone 225 is breached by the personnel 155.

Another intervention procedure would be for the control system 205 to activate a shut-down system 235, whereby the equipment in the respective safety zone 225 is deactivated when the personnel 155 approaches or breaches the safety zone 225. The shut-down system 235 may shut down the piece of equipment within the safety zone 225 that has been approached or breached, as well as any other piece of equipment on the rig 100A or 100B.

In the event of a shut-down of any piece of equipment by the control system 205 via the shut-down system 235, the control system 205 may activate a re-start system 240 that is configured to automatically re-start the pieces of equipment that have been shut-down. The control system 205 may re-start the pieces of equipment as soon as the personnel 155 is out of or a sufficient distance away from the safety zone 255, or after a pre-determined amount of time from when the personnel 155 is out of or a sufficient distance away from the safety zone 255. The piece of equipment that has been shut-down may be re-started manually after other personnel visually check the safety zones 225 to ensure that the personnel 155 are not in danger of a re-start.

Figure 3A:
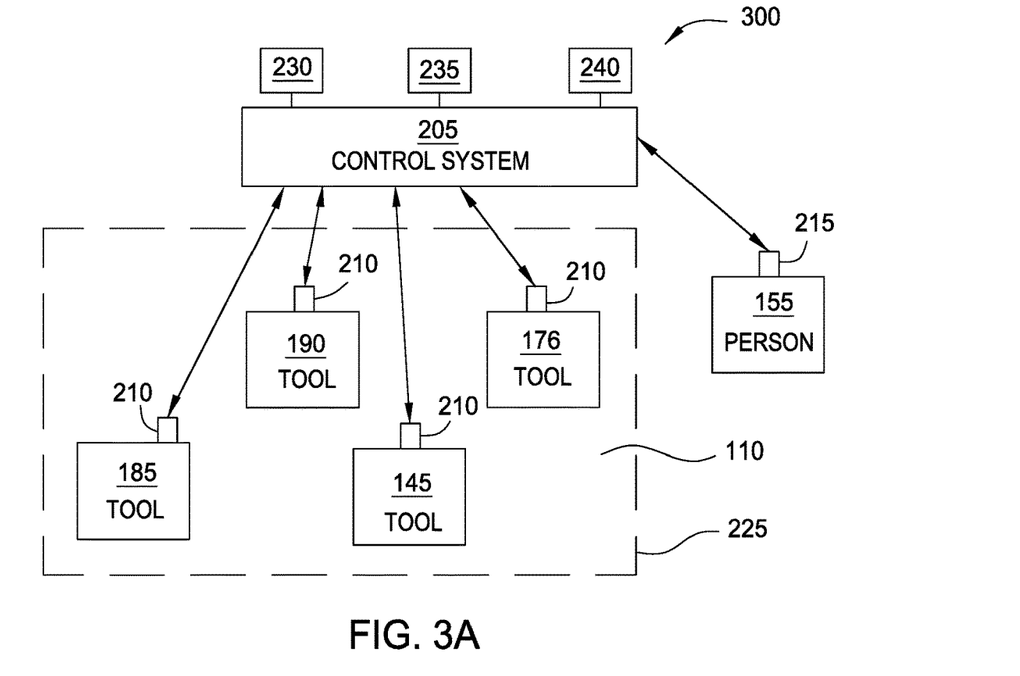
FIG. 3A is a schematic of another intervention system, according to one embodiment.

FIG. 3A is a schematic of an intervention system 300, according to one embodiment. The intervention system 300 is similar to the intervention system 200 in that it includes the control system 205 which is in communication with various pieces of equipment on the rig floor 110. Instead of individual safety zones 225 as shown in FIG. 2A, the control system 205 determines a single safety zone 225 that encompasses multiple pieces of equipment.

The control system 205 calculates the safety zone 225 about a perimeter that encompasses the racking system 190, the top drive 176, the catwalk 185, and the rotary table 145, based on the locations communicated to the control system 205 by the sensors 210. In one embodiment, the control system 205 may be pre-programmed with the safety zone 225. In one embodiment, the control system 205 may use a combination of pre-programmed location information and the location information received by the sensors 210 to determine the safety zone 225.

Figure 3B:
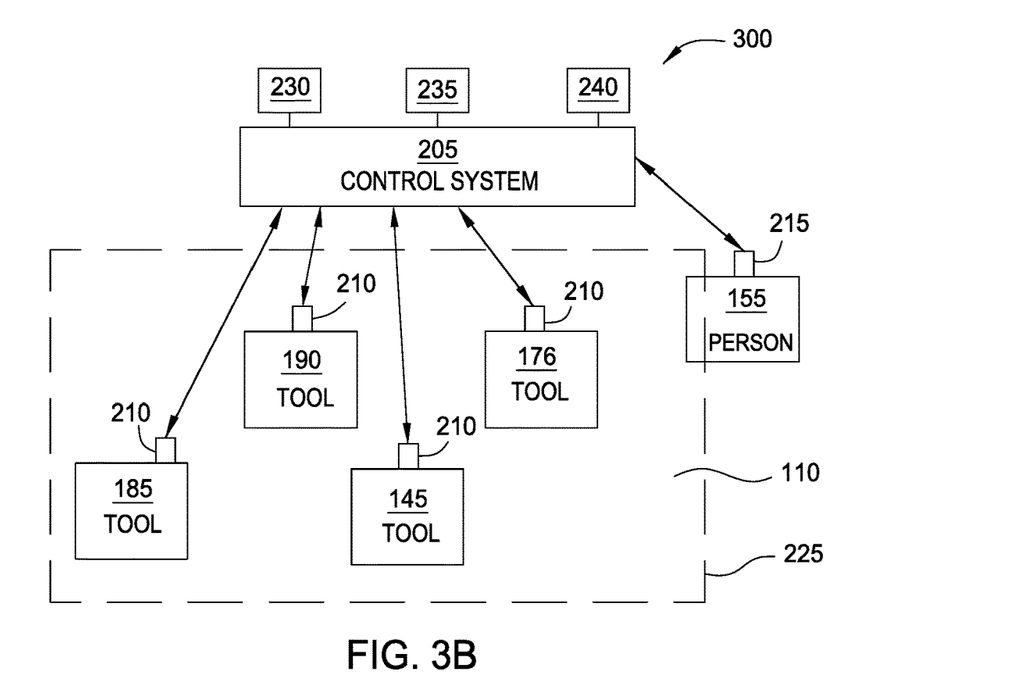
FIG. 3B is a schematic of the intervention system of FIG. 3A in a different operating position, according to one embodiment.

FIG. 3B is a schematic of the intervention system 300 where the personnel 155 is within the safety zones 225. Referring to FIG. 3B, in the event that the personnel 155 are approaching (e.g. within a predetermine distance of and/or enter) the safety zone 225, the control system 205 is configured to enact one or more of the intervention procedures discussed above. In the event that any piece of equipment is approaching (e.g. within a predetermine distance of and/or enter) the boundary of the safety zone 225, the control system 205 is configured to enact one or more of the intervention procedures discussed above.

Figure 4A:
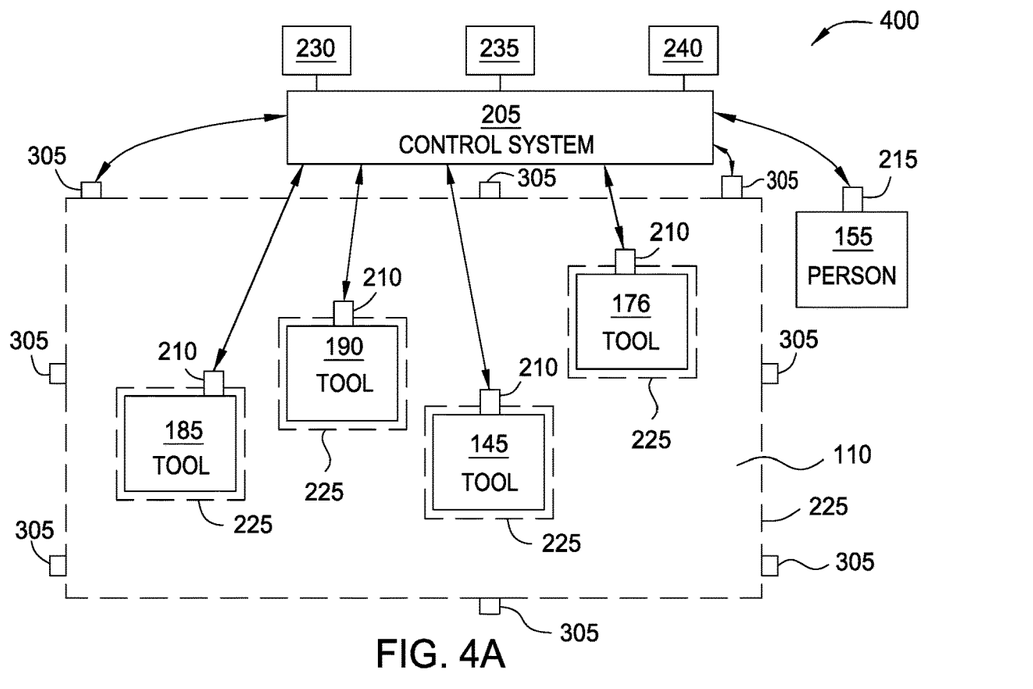
FIG. 4A is a schematic of another intervention system, according to one embodiment.

FIG. 4A is a schematic of an intervention system 400. The intervention system 400 is similar to the intervention systems 200 and 300 in that it includes the control system 205 which is in communication with various pieces of equipment on the rig floor 110. The control system 205 is configured to determine both individual safety zones 225 for each piece of equipment, as well as a single safety zone 225 that encompasses all of the equipment on the rig floor 110.

One or more rig sensors 305 may be use alone or in conjunction with the sensors 210. The sensors 305 may be proximity sensors placed about the rig floor 110 or wellsite that transmit (wired or wirelessly) one or more signals corresponding to the location of the sensors 305 so that the control system 205 can calculate the single safety zone 225 surrounding all of the equipment on the rig floor 110. In one embodiment, the control system 205 may be pre-programmed with any of the safety zones 225. In one embodiment, the control system 205 may use a combination of pre-programmed location information and the location information received by the sensors 210 and/or the sensors 310 to determine any of the safety zones 225.

Figure 4B:
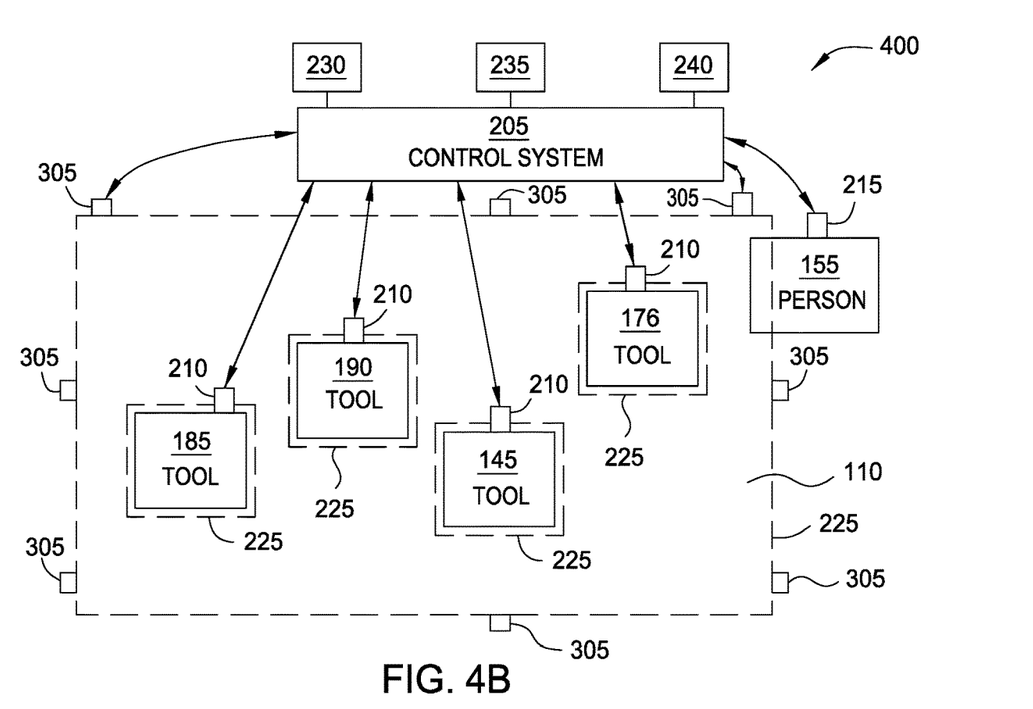
FIG. 4B is a schematic of the intervention system of FIG. 4A in a different operating position, according to one embodiment.

FIG. 4B is a schematic of the intervention system 400 where the personnel 155 is within the safety zone 225. Referring to FIG. 4B, in the event that the personnel 155 are approaching (e.g. within a predetermine distance of and/or enter) any of the safety zones 225, the control system 205 is configured to enact one or more of the intervention procedures discussed above. In the event that any piece of equipment is approaching (e.g. within a predetermine distance of and/or enter) any of the safety zones 225 or the boundary of the single safety zone 225, the control system 205 is configured to enact one or more of the intervention procedures discussed above.

Figure 5:
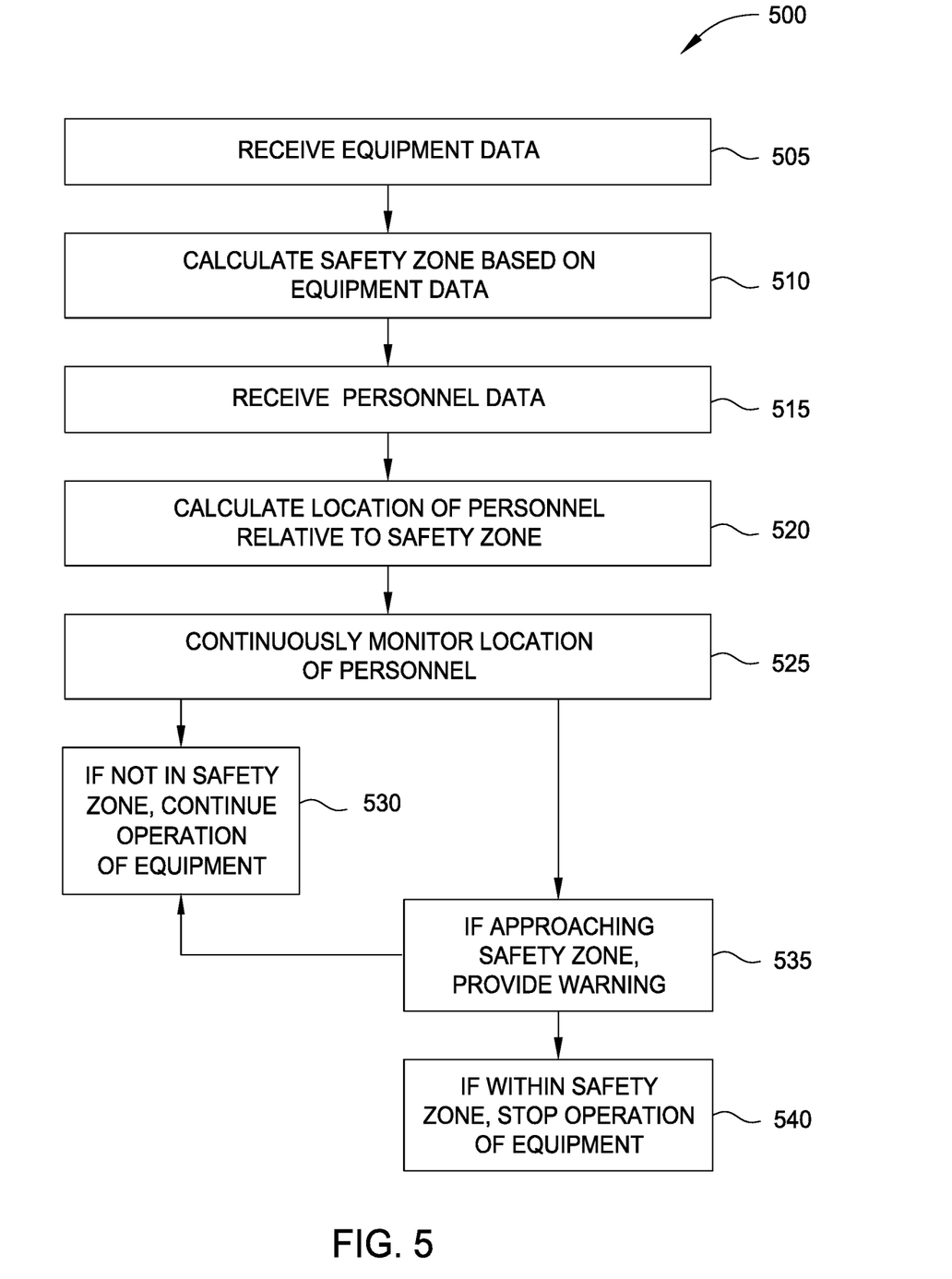
FIG. 5 is a flowchart of an intervention method using one or more of the intervention systems described herein, according to one embodiment.

FIG. 5 is a flowchart of one embodiment of a safety intervention method 500 utilizing any one of the intervention systems 200, 300, and 400. The safety intervention method 500 may be a software routine executed by the control system 205.

At 505, the control system 205 receives equipment data corresponding to the location of a piece of equipment, such as the rotary table 145, the top drive 176, the racking system 190, and/or the catwalk 185. The data may be received from the sensors 210, 305. The data may include information corresponding to the location (e.g. X-coordinates, Y-coordinates, Z-coordinates) of a piece of equipment. The data may be continuously or intermittently monitored during operation.

At 510, the control system 205 calculates the safety zone, such as safety zones 225, of the piece of equipment based on the data received at 505. As the data received at 505 may be continuously monitored during operation, the safety zones may be adjusted if necessary.

At 515, the control system 205 receives personnel data corresponding to the location of personnel, such as personnel 155. The data may be received from the sensor 215. The data may include information corresponding to the location (e.g. X-coordinates, Y-coordinates, Z-coordinates) of the personnel. The data may be continuously or intermittently monitored during operation.

At 520, the control system 205 calculates the location of personnel relative to one or more safety zones determined at 510. At 525, which may be concurrent with 520, the control system 205 continuously monitors the location of personnel relative to the one or more safety zones. At 530, if the control system 205 determines that personnel are not approaching or within one or more of the safety zones, then operation of the equipment is continued.

At 535, if the control system 205 determines that personnel are approaching one or more safety zones (e.g. within a pre-determined distance of a safety zone), then the control system 205 activates an alarm, such as the 230, to warn the personnel. The intervention method 500 may return to 530 when the personnel are warned and move away from the safety zone to continue operation of the equipment.

However, at 540, if the control system 205 determines the personnel are within one or more safety zones, then the control system 205 activates a shut-down of the piece of equipment (via the shut-down system 235 for example) to stop the operation of the equipment. After shut-down, the control system 205 may automatically re-start operation of the equipment (via the re-start system 240 for example) or the equipment may need to be manually restarted when it is determined that personnel are no longer within the safety zone.

While the foregoing is directed to embodiments of the disclosure, other and further embodiments of the disclosure thus may be devised without departing from the basic scope thereof, and the scope thereof is determined by the claims that follow.

The invention claimed is:

1. A safety intervention system, comprising;
a control system in communication with one or more pieces of equipment on a rig or wellsite via an equipment sensor coupled to each piece of equipment and one or more rig sensors located on the rig or wellsite, wherein the control system is configured to monitor a location of each piece of equipment and determine a safety zone for each piece of equipment based on the equipment sensors, and wherein the control system is configured to determine a single safety zone surrounding all of the pieces of equipment based on the rig sensors; and
a personnel sensor coupled to a person, wherein the personnel sensor is configured to provide position information of the person to the control system, and wherein the control system is configured to determine and monitor the person's position relative to each piece of equipment.

2. The system of claim 1, wherein the control system is configured to activate an alarm when the person nears one of the safety zones.

3. The system of claim 1, wherein the equipment sensors and the personnel sensors consist of, or are enabled as, one or more of a global positioning system, radio frequency identification, a camera, sound navigation and ranging, light imaging, detection and ranging, and a motion sensor.

4. The system of claim 1, wherein the control system comprises a shut-down system that is configured to stop operation of at least one of the pieces of equipment when the person is within the safety zone of that piece of equipment.

5. The system of claim 1, wherein the control system comprises the equipment sensor coupled to each piece of equipment and the rig sensors, and wherein the control system is configured to determine the single safety zone surrounding all of the pieces of equipment based on the equipment sensors and the rig sensors.

6. The system of claim 5, wherein the control system is configured to activate an alarm when the person nears the single safety zone.

7. The system of claim 5, wherein the control system is configured to activate an alarm when the person is within the single safety zone.

8. The system of claim 5, wherein the control system comprises a shut-down system that is configured to stop operation of one or more pieces of equipment when the person is within the single safety zone.

9. The system of claim 1, wherein the control system comprises the one or more rig sensors located on the rig or wellsite and the equipment sensors, and wherein the control system is configured to determine the safety zone for each piece of equipment based on the rig sensors and the equipment sensor coupled to each piece of equipment.

10. The system of claim 9, wherein the control system is configured to activate an alarm when the person nears the single safety zone.

11. The system of claim 9, wherein the control system is configured to activate an alarm when the person is within the single safety zone.

12. The system of claim 9, wherein the control system comprises a shut-down system that is configured to stop operation of one or more pieces of equipment when the person is within the single safety zone.

13. A safety intervention method, comprising:
receiving equipment data from an equipment sensor coupled to a piece of equipment and a rig sensor located on a rig or wellsite;
monitoring a location of the piece of equipment based on equipment data received from the equipment sensor;
calculating a safety zone of the piece of equipment based on the equipment data received from the equipment sensor;
calculating a single safety zone surrounding the piece of equipment based on the equipment data received from the rig sensor;
receiving personnel data from a personnel sensor on a person;
calculating a location of the person based on the personnel data;
monitoring the person's position relative to the safety zone of the piece of equipment and the single safety zone surrounding the piece of equipment; and
determining whether the person is near or within the safety zone of the piece of equipment or the single safety zone surrounding the piece of equipment.

14. The method of claim 13, further comprising continuously monitoring the location of the person relative to the safety zone of the piece of equipment or the single safety zone surrounding the piece of equipment.

15. The method of claim 14, further comprising activating an alarm when the person is near or within the safety zone of the piece of equipment or the single safety zone surrounding the piece of equipment.

16. The method of claim 15, further comprising stopping operation of the piece of equipment when the person is within the safety zone of the piece of equipment or the single safety zone surrounding the piece of equipment.

17. The method of claim 16, further comprising automatically re-starting operation of the piece of equipment when the person is no longer within the safety zone of the piece of equipment or the single safety zone surrounding the piece of equipment.

* * * * *